United States Patent
Panni et al.

(10) Patent No.: US 12,463,459 B2
(45) Date of Patent: Nov. 4, 2025

(54) METHODS AND SYSTEMS FOR ENHANCED ACTIVE POWER CONTROL DURING FREQUENCY DEVIATION

(71) Applicant: VESTAS WIND SYSTEMS A/S, Aarhus (DK)

(72) Inventors: Rubin Panni, Aarhus (DK); Henrik Møller, Egå (DK)

(73) Assignee: VESTAS WIND SYSTEMS A/S, Aarhus (DK)

( * ) Notice: Subject to any disclaimer, the term of this patent is extended or adjusted under 35 U.S.C. 154(b) by 350 days.

(21) Appl. No.: 18/262,057

(22) PCT Filed: Jan. 3, 2022

(86) PCT No.: PCT/DK2022/050001
§ 371 (c)(1),
(2) Date: Jul. 19, 2023

(87) PCT Pub. No.: WO2022/156866
PCT Pub. Date: Jul. 28, 2022

(65) Prior Publication Data
US 2024/0097486 A1   Mar. 21, 2024

(30) Foreign Application Priority Data
Jan. 21, 2021   (DK) ............................ PA 2021 70028

(51) Int. Cl.
*H02J 13/00* (2006.01)
*H02J 3/00* (2006.01)

(52) U.S. Cl.
CPC ........ *H02J 13/00002* (2020.01); *H02J 3/004* (2020.01); *H02J 2203/20* (2020.01)

(58) Field of Classification Search
CPC .. H02J 13/00002; H02J 3/004; H02J 2203/20; H02J 2300/20; H02J 3/381; H02J 3/48
See application file for complete search history.

(56) References Cited

U.S. PATENT DOCUMENTS

| | | | |
|---|---|---|---|
| 2009/0055030 A1* | 2/2009 | Mayor | F03D 7/0284 700/287 |
| 2013/0185007 A1* | 7/2013 | Imre | G01R 31/392 702/63 |

(Continued)

FOREIGN PATENT DOCUMENTS

| | | |
|---|---|---|
| CN | 108306312 B | 11/2020 |
| EP | 3540896 A1 | 9/2019 |

(Continued)

OTHER PUBLICATIONS

Danish Patent and Trademark Office, 1st Technical Examination including the Search Report and Search Opinion for Application PA 2021 70028 dated Jul. 16, 2021.

(Continued)

*Primary Examiner* — Ziaul Karim
(74) *Attorney, Agent, or Firm* — Patterson + Sheridan, LLP; Gero G. McClellan

(57) ABSTRACT

Aspects of the present invention relate to a method for controlling active power output of a renewable energy power plant comprising one or more renewable energy generators. Aspects of the invention may be used to control the active power output of a wind energy power plant and to determine accurate estimates of the available active power when the frequency level of the connected power network is outside of the frequency deadband.

22 Claims, 9 Drawing Sheets

(56) References Cited

U.S. PATENT DOCUMENTS

| | | | | |
|---|---|---|---|---|
| 2015/0022007 A1* | 1/2015 | Ma | ......................... | H02J 3/241 |
| | | | | 307/84 |
| 2015/0185716 A1* | 7/2015 | Wichmann | ................ | F02C 9/28 |
| | | | | 700/287 |
| 2016/0281607 A1* | 9/2016 | Asati | ......................... | F02C 7/26 |
| 2017/0364043 A1* | 12/2017 | Ganti | .................... | G05B 17/02 |
| 2018/0259917 A1* | 9/2018 | Ewens | ................... | H02J 3/381 |
| 2018/0284758 A1* | 10/2018 | Cella | ................. | G05B 23/0264 |
| 2019/0171187 A1* | 6/2019 | Cella | ...................... | G06N 3/126 |
| 2020/0350765 A1* | 11/2020 | Christensen | ...... | H02J 13/00002 |

FOREIGN PATENT DOCUMENTS

| | | | |
|---|---|---|---|
| EP | 3398236 B1 | 10/2019 | |
| EP | 3618216 A1 | 3/2020 | |

OTHER PUBLICATIONS

PCT, Notification of Transmittal of the International Search Report and the Written Opinion of the International Searching Authority, or the Declaration for Application PCT/DK2022/050001 dated Mar. 28, 2022.

Aziz Asma et al., "Intelligent Frequency Regulation in the Wind Integrated Control Area," Computers & Electrical Engineering, vol. 72, dated Oct. 9, 2018, pp. 324-347.

\* cited by examiner

METHODS AND SYSTEMS FOR ENHANCED ACTIVE POWER CONTROL DURING FREQUENCY DEVIATION

TECHNICAL FIELD

The present disclosure relates to methods and systems for enhanced active power control during frequency deviation.

BACKGROUND

Regulators and operators of power networks expect connected power plants to adhere to a 'grid code' and to provide particular services to the power network.

For example, some operators require power plants to support the power network when the frequency of the power network deviates from the normal operational range or a permissible range, also referred to as a frequency dead band. A range of control strategies have been developed for wind power plants to provide support during frequency deviations. During these events, power plant controllers and wind turbine controllers implement frequency support by changing active power output levels to counteract the frequency deviation. In under-frequency events, where the frequency level deviates below the frequency dead band, active power output levels are increased to support the network. In over-frequency events, where the frequency level rises above the frequency dead band, active power output levels are decreased to provide support.

However, during a frequency event, the active power output from a power plant is often controlled based on an estimate of the available power from the power plant. Errors in the estimate of available power cause errors in the response to the frequency event, as the active power output is too high or too low and the power network is inadequately supported.

It is an aim of the present invention to address one or more of the disadvantages associated with the prior art.

SUMMARY OF THE INVENTION

According to an aspect of the present invention there is provided a method for controlling the active power output of a renewable energy power plant, such as a wind energy power plant for example. The renewable energy power plant comprises one or more renewable energy generators. For example, the renewable energy power plant may comprise one or more wind turbine generators. The method comprises: while a measured frequency level of a power network to which the power plant is connected is within a frequency deadband: determining an estimated active power output from the power plant according to a model of the power plant and one or more model inputs; and determining a measured active power output from the power plant; the method further comprising: determining an estimate of available active power for the power plant to supply according to the model of the power plant and one or more model inputs; determining an estimate correction factor based on a comparison of the estimated active power output with respect to the measured active power output; correcting the estimate of available active power based on the estimate correction factor to provide a corrected estimate of available active power; and when the frequency level of the power network is outside the frequency deadband, determining and dispatching active power set points for controlling the one or more renewable generators of the power plant, the set points being determined based on the corrected estimate of available active power and the frequency level.

The invention is configured to provide enhanced active power output control by determining more accurate estimates of the available active power for the power plant to supply to the connected power network during a frequency event, i.e. when the frequency level is outside of the permissible range/frequency deadband.

For this purpose, the invention uses a model of the power plant to determine the estimate of the available active power and the method advantageously refines, or corrects, the estimate of the available active power by determining an error associated with the model. For example, the model may provide a mathematical function relating the power generation at the one or more renewable energy generators to the power delivery at the power network (or the connection thereto), accounting for the power loss between the one or more renewable energy generators and the power network. The error is determined by comparing estimates, based on the model, of the active power output to corresponding measurements of the active power output actually produced while the frequency level is within the frequency deadband.

It shall be appreciated that references to estimates of the 'available active power' for the power plant refer to the maximum amount of power that could be supplied to the power network in the respective conditions, for example for a given wind speed condition. Hence, references to estimates of the 'available active power' refer to the amount of power that could be produced in the given wind conditions without exceeding the rated power of the one or more renewable energy generators, and in the absence of power curtailment of the one or more renewable energy generators.

The active power output from the power plant may vary in dependence on the actual operation of the one or more renewable energy generators in the respective conditions. For example, the active power output from the power plant may vary in dependence on an amount of power curtailment applied to the one or more renewable energy generators to reduce or restrict their power output relative to the available active power.

Hence, while the frequency level is within the frequency deadband, it can be assumed that, in the absence of power curtailment, or where the amount of curtailment is negligible, the estimated active power output and the measured active power output will correspond to an estimate of the available active power. However, where the power curtailment is not negligible, it can be assumed that the estimated active power output and the measured active power output will differ from the estimate of the available active power.

The estimated active power output from the power plant, and the measured active power output from the power plant, relate to the power outputs delivered to the connected power network, for example as determined at a power grid point of interconnection.

For the sake of clarity, the phrase 'within the frequency deadband' is intended to mean that the measured frequency level is equal to, or less than, an upper limit of the frequency deadband, and equal to, or greater than, a lower limit of the frequency deadband. Furthermore, by 'determining' a measured active power output from the power plant it is intended to mean that, in examples of the invention, the method may fetch, recall, or measure an active power output from the power plant. Similarly, by 'determining' an estimate correction factor based on a comparison of the estimated active power output with respect to the measured active power output it is intended to mean that the estimate correction factor may be calculated, or quantified, whilst the frequency level is within the frequency deadband and fetched, or recalled, when the frequency level is outside of the deadband; or ii) the estimate correction factor may be quantified once the frequency level is outside of the deadband.

Optionally, determining the estimate correction factor comprises at least one of: determining a difference, or error value, between the estimated active power and the measured active power output; and/or determining a ratio, or percentage error, of the measured active power output with respect to the estimated active power output. For example, the estimate correction factor may be determined by scaling the estimate of available active power according to the determined ratio.

In an example, the estimate correction factor is determined based on a combination of: the determined difference; and the estimate of available active power, scaled according to the determined ratio. For example, the estimate correction factor may be determined based on a function that combines, for example in relative proportions, the error value and the estimate of available active power scaled according to the percentage error.

For example, the function may take the form: $Pc = X*(e_v) + (1-X)*(e_p)*Pnet + Pnet$; where Pc is the corrected estimate of available active power, $e_v$ is the determined error value, $e_p$ is the percentage error, X is a proportional contribution of the error value, Pnet is the estimate of available active power. The proportional contribution of the error value, X, may be a predetermined constant, for example.

The model of the power plant may, for example, comprise a model of the power loss between the power plant and the power network. In this manner, the model of the power plant may relate the power generation at the one or more renewable energy generators to the power delivery at the power network (or the connection thereto), accounting for the power loss between the one or more renewable energy generators and the power network, which may be attributable to transmission loss through the balance of plant and/or connecting network, for example. In an example, the model of the power loss may comprise a function in the form of a quadratic equation in terms of the one or more model inputs. The function may take the form: $Ploss = (a \cdot (\Sigma Y)^2 + b \cdot (\Sigma Y) + c))$; where Ploss is the power loss between the power plant and the power network; and $\Sigma Y$ is a model input, which may relate to the power level at the one or more renewable energy generators.

In an example, the model of the power plant may comprise a model of the output of the power plant to the power network from which the model of the power loss is subtracted. The model of the output of the power plant being a model for determining the combined power generation from the one or more renewable energy generators, for example.

Optionally, the one or more model inputs for determining the estimated active power output may comprise active power output measurements of the renewable energy generators. In this context, the active power output measurement of the renewable energy generators relates to the amount of power that the one or more renewable energy generators are able to produce based on the control strategy applied thereto during the respective conditions. For example, where the control strategy includes power curtailment of the one or more renewable energy generators, the active power output measurements of the renewable energy generators may provide suitable model inputs for determining the estimated active power output. Where the renewable energy generators include one or more wind turbine generators, the active power output measurements of the renewable energy generators may therefore be determined based on a windspeed measurement, an amount of curtailment of the one or more renewable energy generators, and/or an amount of spinning reserve, for example.

Optionally, the one or more model inputs for determining the estimated available active power output may comprise available active power measurements of the renewable energy generators. In this context, the available active power measurement of the renewable energy generators relates to the maximum amount of power that the one or more renewable energy generators are able to produce for the respective conditions. For example, the available active power output measurements of the renewable energy generators may provide suitable model inputs for determining the estimated available active power output during the respective conditions when the control strategy includes zero, or a negligible amount, of power curtailment of the one or more renewable energy generators. To give an example, the available active power measurements may be determined based on a windspeed measurement.

Optionally, the method further comprises determining an amount of curtailment of the active power output of the renewable energy generators.

Optionally, if the amount of curtailment is substantially non-zero, the one or more model inputs for determining the estimated active power output may comprise active power output measurements of the renewable energy generators; or if the amount of curtailment is substantially zero, the one or more model inputs for determining the estimated active power output may comprise available active power measurements of the renewable energy generators.

In this manner, the estimated active power output is adapted to account for the amount of power curtailment.

In an example, the one or more model inputs for determining the estimate of available active power comprise available active power measurements of the renewable energy generators. As discussed above, in this context, the available active power measurement of the renewable energy generators relates to the maximum amount of power that the one or more renewable energy generators are able to produce for the respective conditions.

The one or more renewable energy generators may, for example, comprise one or more wind turbine generators. Hence, available active power measurements of the renewable energy generators may be based on wind speed measurements of the one or more wind turbine generators, for example.

In an example, determining the estimate correction factor may comprise: calculating the estimate correction factor when the frequency level of the power network is outside the frequency deadband based on the measured active power output from the power plant, and the estimated active power output from the power plant, determined while the frequency level is within the frequency deadband. In this manner, the estimate correction factor may be determined once outside the frequency deadband using data determined whilst within the frequency deadband.

Optionally, calculating the estimate correction factor when the frequency level of the power network is outside the frequency deadband comprises: determining the most recently measured active power output from the power plant that precedes the frequency level of the power network being outside the frequency deadband; and determining, for comparison, the estimated active power output from the power plant that is concurrent with that determined measured active power output. In this manner, suitable estimates and measurements of the active power output may be compared to determine the estimate correction factor.

In an example, determining the estimate correction factor may comprise: calculating the estimate correction factor while the frequency level of the power network is within the frequency deadband. Optionally, determining the estimate correction factor may further comprise: storing the calculated estimate correction factor in a memory storage; and when the measured frequency level of the power network is outside the frequency deadband, recalling the calculated estimate correction factor from the memory storage.

For example, the most recently calculated estimate correction factor may be recalled from the memory storage when the measured frequency level of the power network is outside the frequency deadband. In this manner, the estimate correction factor may be effectively fetched once outside the frequency deadband having been determined previously, whilst within the frequency deadband.

In an example, the steps of determining the estimate of available active power for the power plant to supply and correcting the estimate of available active power are carried out, at least, when the frequency level of the power network is outside the frequency deadband, Optionally, the steps of determining the estimate of available active power for the power plant to supply and correcting the estimate of available active power are carried out while the frequency level of the power network is within the frequency deadband and when the frequency level of the power network is outside the frequency deadband, According to another aspect of the invention there is provided a power plant controller configured to perform the method described in a previous aspect of the invention.

According to an aspect of the invention, there is provided a computer-readable storage medium comprising instructions that, when executed by a computer, cause the computer to perform the method described above.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Generally, the present application relates to methods and systems for controlling the active power output of a renewable energy power plant. Particularly though, the present application relates to methods and systems for providing such active power output control when the frequency level of a connected power network is outside of an acceptable or permissible frequency range, known as a frequency deadband. The frequency deadband may be defined by an operator or a grid code, for example. In the following description, periods during which the frequency level deviates outside of the frequency deadband, may be referred to as 'frequency events'.

The methods and systems of the present application are configured to determine estimates of the active power output from the power plant prior to the frequency event, i.e. while the measured frequency level is within the frequency deadband, using a model of the power plant and to record, or receive, corresponding measurements of the active power output from the power plant for comparison. When the frequency level subsequently moves outside of the acceptable frequency range (during a frequency event), an estimate of the available active power that the power plant is able to supply to the power network can be determined using the model of the power plant and the estimate can be refined, or corrected, based on a comparison between the estimated and measured active power outputs. The methods and system determine and dispatch active power set points, based on the corrected estimate of available active power, for controlling the renewable energy generators during the frequency event. The benefit of this is that errors in the estimate of available active power are reduced, leading to enhanced control of the active power output, for example enabling faster response to frequency events.

Figure 1:
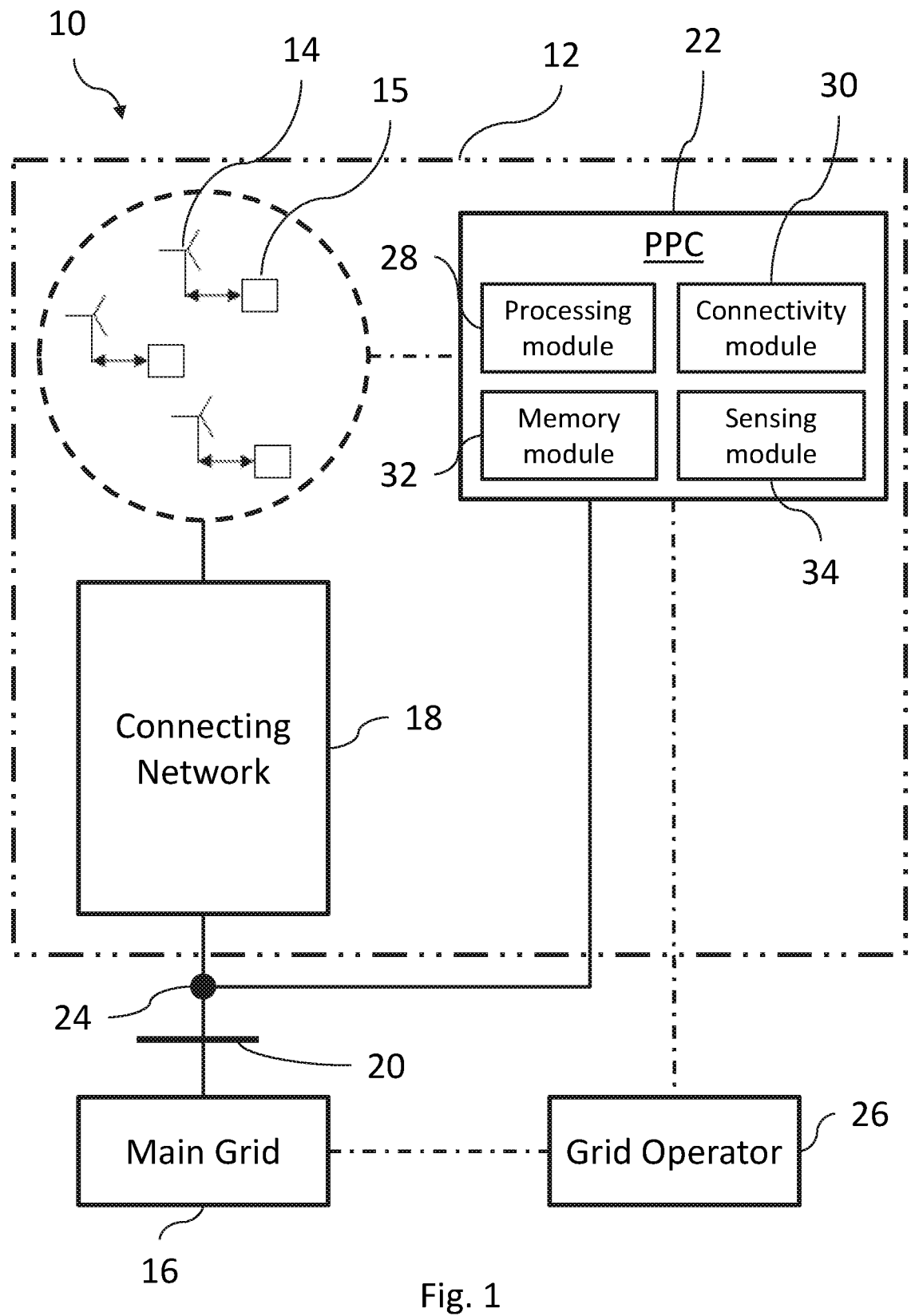
FIG. 1 shows a power network including a wind power plant and a power plant controller.

FIG. 1 illustrates a typical architecture in which a renewable energy power plant, such as a wind power plant (WPP), is connected to a main grid as part of a wider power network. As will be understood by the skilled reader, a WPP comprises at least one wind turbine generator (WTG), and is also known as a wind park or a wind farm. A WTG is commonly referred to as a wind turbine. The example shown is representative only and the skilled reader will appreciate that other specific architectures are possible. In other examples, the power plant include other renewable energy sources such as a solar power plant, a bio energy power plant, an ocean/wave/tidal energy plant, or a hybrid power plant having a combination of different types of renewable energy power plants. Thus, the invention also relates to renewable energy power plants and renewable energy generators in general, rather than being specific to wind power plants and generators as in the Figures. The components of the wind power plant and power network are conventional and as such would be familiar to the skilled reader. It is expected that other known components may be incorporated in addition, or as alternatives, to the components shown and described in FIG. 1. Such changes would be within the capabilities of the skilled person.

FIG. 1 shows a power network 10 incorporating a WPP 12. In this example, the WPP 12 includes a plurality of WTGs 14 and a power plant controller 22, referred to hereafter as PPC 22. Each of the plurality of WTGs 14 converts wind energy into electrical energy, which is transferred from the WPP 12 to a main transmission network or main grid 16, as active power and/or current, for distribution. Individual generators may each be referred to as a 'unit' in this description.

Although not illustrated in this Figure, the WPP 12 may also include compensation equipment, such as a static synchronous compensator (STATCOM) or another type of synchronous compensator, configured to provide reactive power or reactive current support as required. The WPP 12 may also include a battery energy storage system.

Each of the WTGs 14 is associated with a respective WTG controller 15. In some examples, a set of WTGs may share a single, semi-centralized WTG controller, such that there are fewer WTG controllers than WTGs. As would be understood by the skilled person, WTG controllers 15 can be considered to be computer systems capable of operating a WTG 14 in the manner prescribed herein, and may comprise multiple modules that control individual components of the WTG or just a single controller. The computer system of the WTG controller 15 may operate according to software downloaded via a communications network or programmed onto it from a computer-readable storage medium.

During normal operation of the WPP 12, the WTG controllers 15 operate to implement active and reactive current, and/or power, requests received from the PPC 22 to provide frequency and voltage support to the main grid 16. During extraordinary conditions, the WTG controllers 15 operate to fulfil predetermined network requirements, and also act to protect the WTGs 14 from any potentially harmful conditions.

The WPP 12 also includes a connecting network 18 for connecting the WPP 12 to the main grid 16 (also called the main power network). In this example, the WPP 12 and the main grid 16 are connected at a Point of Interconnection (PoI) 20, which is an interface between the WPP 12 and the main grid 16. The PoI 20 may also be referred to as the Point of Common Connection, which may be abbreviated to 'PCC' or 'PoCC'.

The Power Plant Controller (PPC) 22 is connected to the main grid 16 at a Point of Measurement (PoM) 24 and is connected to the WTG controllers 15. For example, the PPC 22 may be configured to receive one or more measurement signals from the PoM 24 comprising measurements of the power supply from the WPP 12 to the main grid 16 and/or a frequency level of the main grid 16. The PPC 22 may also be configured to receive one or more measurement signals from the WTG controllers 15 comprising information that is indicative of the operative state of the respective WTGs 14, such as a wind speed measurement, an amount of spinning reserve, or an amount of power curtailment at the respective WTGs 14. The role of the PPC 22 is to act as a command and control interface between the WPP 12 and the grid 16, and more specifically, between the WPP 12 and a grid operator 26, such as a transmission system operator (TSO) or a distribution system operator (DSO). The WPP 12 is capable of altering its power or current output in reaction to commands received from the PPC 22.

The PPC 22 is a suitable computer system for carrying out the controls and commands as described herein and so may incorporate a processing module 28, a connectivity module 30, a memory module 32 and a sensing module 34, for example.

The connectivity module 30, the memory module 32, and/or the sensing module 34 are configured to provide the processing module 28 with information that is indicative of a frequency level of the main grid 16, as well as power levels, current levels and/or voltage levels of the WTGs 14 and/or the WPP 12.

For example, the sensing module 34 may receive such information directly from one or more connected sensors (e.g. at the PoM 24) and communicate the information to the processing module 28. Alternatively, or additionally, the information may be determined by one or more systems that are connected to the connectivity module 30, such as the WTGs controllers 15, and the information may be communicated, in turn, through the connectivity module 30 to the processing module 28. In each case, the determined information may be stored permanently, or temporarily, in the memory module 32, from which it may be recalled, on demand, by the processing module 28. The PPC 22 may also receive information regarding the grid 16 and/or the local buses, substations and networks from an energy management system (not shown).

As part of its operation, the PPC 22 generates and sends dispatch signals to the WTG controllers 15. The WTG controllers 15 control the WTGs 14 according to set points contained within the dispatch signals.

The PPC 22 acts to operate the WTGs 14 to provide frequency support to the grid 16 when the frequency level of the main grid 16 deviates from the frequency deadband, in a frequency event. The frequency deadband is generally a small region around the operating frequency of the power network, typically 50 Hz, or in some examples, 60 Hz, as measured at the PoI 20 or PoM 24.

To provide such frequency support, the PPC 22 issues dispatch signals configured to cause the WTGs 14 to supply active power, where the dispatch signals are determined to control the active power output of the WTGs 14 so that frequency levels are supported in returning to the deadband.

For example, when the frequency level drops outside of the deadband, and is therefore below the deadband, the PPC 22 provides frequency support by dispatching increased active power set points to the WTGs 14. When frequency levels rise above the deadband, the PPC 22 provides frequency support by dispatching decreased active power set points. These are known as under-frequency and over-frequency events respectively.

Figure 2:
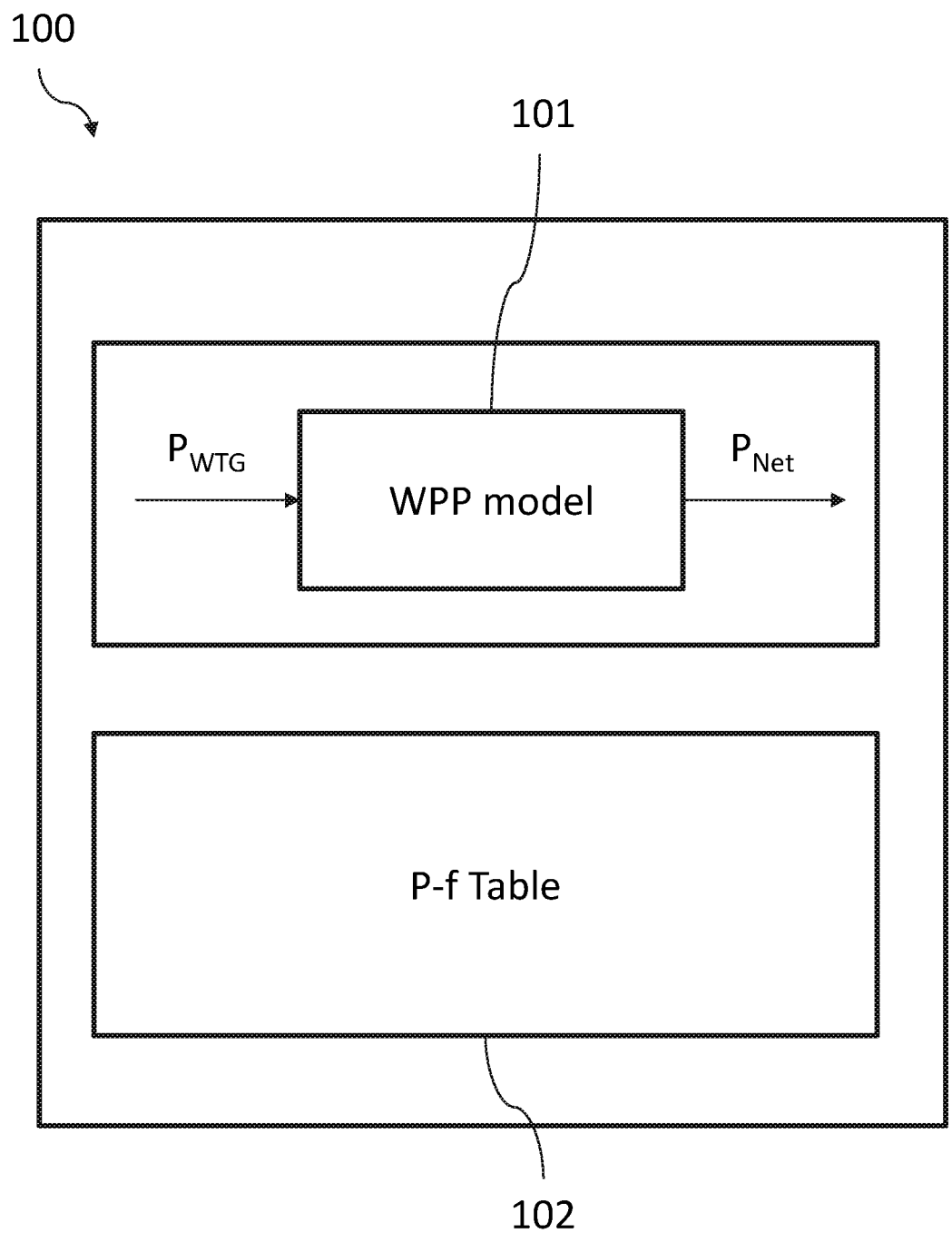
FIG. 2 shows a system diagram of a controller of the power plant controller of FIG. 1 according to an embodiment of the invention.

FIG. 2 illustrates a frequency control scheme, algorithm, or "controller" 100, which forms part of the processing module 28 of the PPC 22 for determining and dispatching such active power set points during a frequency event.

In particular, the controller 100 is configured to receive a measured frequency level of the connected main grid 16, or information that is indicative of that frequency level, and to determine active power set points for controlling the active power output from the WPP 12 when the frequency level of the connected main grid 16 is outside of the frequency deadband.

In order to determine the active power set points, the controller 100 is configured to determine estimates of the available active power delivery to the main grid 16 from the WPP 12.

For this purpose, the controller 100 comprises a model 101 of the WPP 12 configured to receive one or more model inputs relating to the power levels at the WTGs 14 and to model the resulting power delivery levels at the main grid 16. In this manner, the model 101 accounts for power loss between the WPP 12 and the main grid 16.

The model 101 of the WPP 12 may take various forms for modelling the power delivery levels at the main grid 16. In an example, the model 101 may take the form of a function relating the model inputs to the power delivery level at the main grid 16. For example, the function may take the generic form:

$$Pnet = \Sigma Pwtg - (a \cdot (\Sigma Pwtg)^2 + b \cdot (\Sigma Pwtg) + c));$$

where Pnet is the power delivery level at the main grid 16; and ΣPwtg is the power level at the WTGs 14, which may be provided by the model input in the form of an active power level, or an available active power level. For the sake of clarity, it shall be appreciated that available active power levels of the WTGs 14 relate to the maximum amount of power that the WTGs 14 are able to produce for the respective conditions. In other words, the amount of power that could be produced in the absence of power curtailment of the WTGs 14. Meanwhile, the active power output levels vary in dependence on the actual operation of the WTGs 14 during the respective conditions and relate to the maximum power that could be extracted from the wind by the WTGs 14, accounting for such power curtailment.

It shall be appreciated that the model of the WPP 12 effectively includes a power loss model, configured to model the power loss between the WTGs 14 and the main grid 16.

In this example, the power loss model is in the form of a quadratic function, where the coefficients, a, b, and c, of the equation are optimised to estimate the power loss. For example, the coefficients, a, b, and c, may be derived from a data fitting process performed for historic power level measurements.

The example model 101, described above, is not intended to be limiting on the invention though and, in other examples, the model of the WPP 12 may include other suitable functions or algorithms for modelling the power delivery to the main grid 16.

The controller 100 may be configured to receive or otherwise determine the model inputs. For example, as mentioned previously, the controller 100 may be configured to receive one or more measurement signals comprising information that is indicative of the power levels of the WTGs 14. Such information may include a wind speed measurement, an amount of curtailment of the active power output of the WTGs 14 (i.e. an amount of curtailment of one or more of the wind turbines 14 of the WPP 12), and/or amount of spinning reserve at one or more of the wind turbines 14 of the WPP 12. The measurement signals may be received from the connectivity module 30, or the memory module 32, for example.

Various method are known in the art for determining active power output levels and available active power levels for the WTGs of a WPP and so it shall be appreciated that such methods are not described in detail here to avoid obscuring the invention.

During a frequency event, the controller 100 is configured to use the model 101 to determine an estimate of available active power that the WPP 12 can supply to the main grid 16. Advantageously, the controller 100 is also configured to refine such estimates of the available active power based on actual measurements of the active power output to the main grid 16 whilst the frequency level was within the frequency deadband, i.e. prior to the frequency event. For this purpose, the controller 100 is configured to receive determined measurements of the active power output at the main grid 16, which may be determined at the PoM 24 and received from the sensing module 34, or the memory module 32, for example. The configuration of the controller 100 for refining such estimates, shall be described in more detail in the following description.

In an example, the controller 100 is configured to determine the active power set points based on the corrected estimate of available active power and a frequency dependent power adjustment configured to increase or decrease the active power to support the main grid 16. For example, the controller 100 may be configured to determine a frequency dependent power adjustment value, which is applied to the corrected estimate of available active power in order to determine the active power set points.

In an example, the controller 100 may be configured to receive a measured frequency level (of the main grid 16), $f_{meas}$, and to determine the frequency dependent power adjustment value, ΔP, corresponding to the measured frequency level. For this purpose, the controller 100 may also comprise, or have access, for example via the memory module 32, to an active power-frequency correspondence table 102, which may be referred to as a P-f table 102. The P-f table 102 may comprise a look-up table of measured frequency level vs change in power level ΔP, or the P-f table 102 may comprise a look-up table of change in frequency level from a nominal value $f_{nom}$ (i.e. a frequency error value of $f_{meas} - f_{nom}$) vs change in power level ΔP.

In this manner, the controller 100 provides frequency dependent active power set points, whereby the controller 100 determines increased active power set points during an under frequency event and reduced active power set points during an over frequency event to support the main grid 16.

The operation of the controller 100 shall now be described with additional reference to FIGS. 3 to 8.

Figure 3:
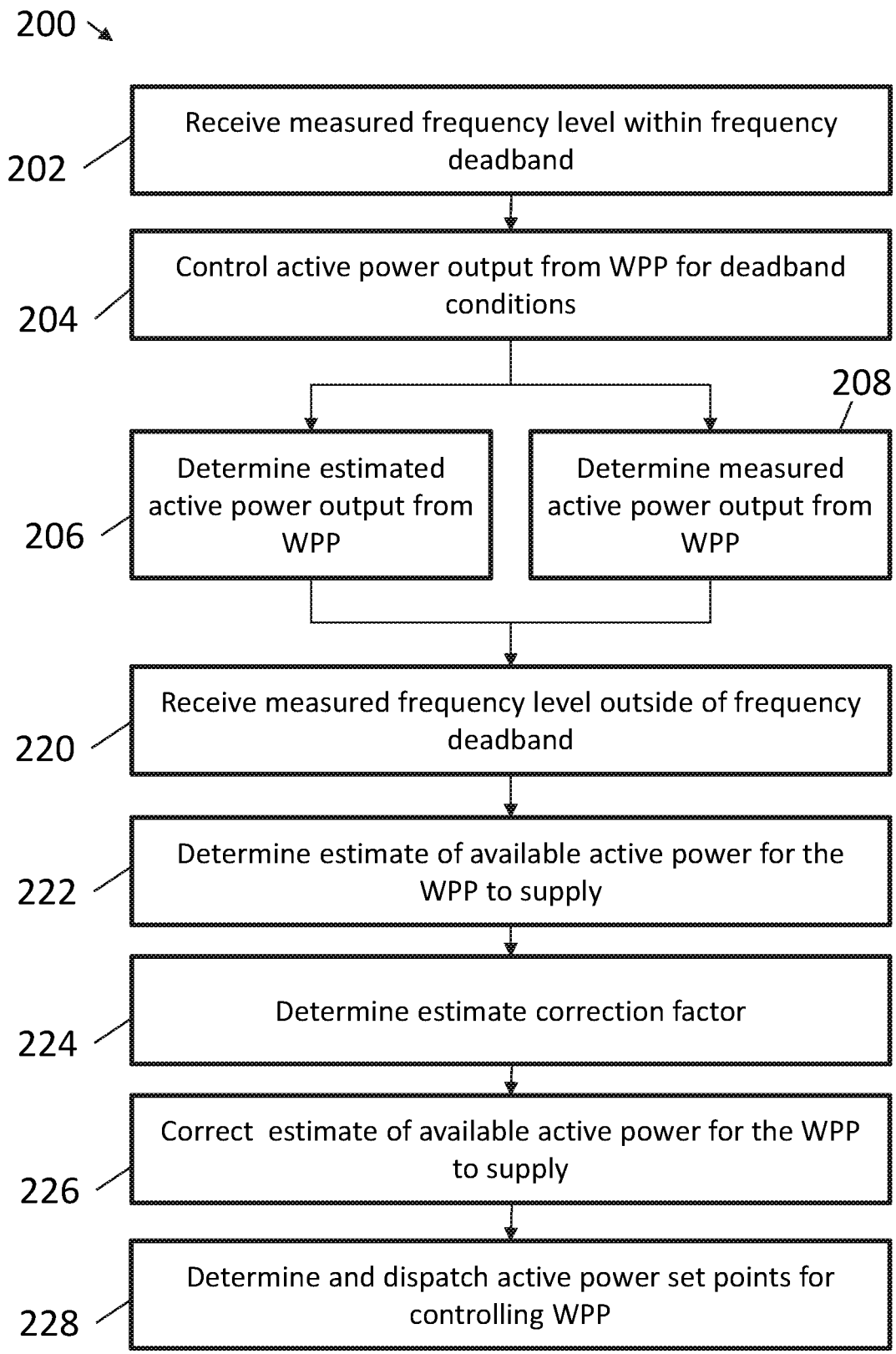
FIG. 3 shows a method of operating the controller of FIG. 2 according to an embodiment of the invention.

FIG. 3 shows an example method 200 of controlling the active power output of the WPP 12, in accordance with an embodiment of the invention.

During the operation of the WPP 12, the frequency level of the main grid 16 may ordinarily fluctuate within the frequency deadband. However, sudden changes in power generation, or load, within the main grid 16 can lead to an over frequency event or an under frequency event, in which the frequency level of the main grid 16 crosses the frequency deadband. For example, the frequency level of the main grid 16 may remain within the frequency deadband for a period of time, until an over frequency event occurs, for example at a point, t1, at which the frequency level crosses, and exceeds, an upper limit of the frequency deadband. Thereafter, the controller 100 may determine and dispatch active power set points according to the method 200 for controlling the active power output of the WPP 12.

While the frequency level is within the frequency deadband, i.e. up to the point t1, the controller 100 may receive a measurement of the frequency level of the main grid 16 and determine, in step 202, that the frequency level is within the frequency deadband.

For example, the controller 100 may compare the measured frequency level to an upper limit and/or a lower limit of the frequency deadband and determine that the frequency level is within, or at, the upper and lower limits of the deadband. The measured frequency level may be determined at the PoM 24 and received via the sensing module 34, for example.

On this basis, the active power output of the WPP 12 may be controlled in accordance with a deadband frequency mode of operation, in step 204, and the controller 100 may monitor the measured frequency level to detect whether the frequency level moves outside of the frequency deadband. The deadband frequency mode of operation may, for example, be controlled by another controller of the processor module 28 or another control system of the PPC 22.

In accordance with the deadband frequency mode of operation, the PPC 22 may, for example, control the WPP 12 so as to satisfy the power demands of the grid operator 26 and protect the WTGs 14, applying power curtailment, or power boosting, as necessary.

The controller 100 may be configured to determine an estimated active power output from the WPP 12, in step 206, and to determine a measured active power output from the WPP 12, in step 208, whilst the measured frequency level is within the frequency deadband. For example, the controller may determine the estimated, and measured, active power inputs throughout the period preceding the frequency event, for example at regular intervals, or in response to the measured frequency level reaching the upper or lower limit of the frequency deadband.

Accordingly, in step 208, the controller 100 may, for example, receive a measurement signal comprising a measurement of the active power output from the WPP 12. The measurement signal may, for example, be determined at the PoM 24, before being received at the controller 100 from the sensing module 34, or the memory module 32.

In step 206, the controller 100 is configured to determine an estimate of the active power output from the WPP 12. The estimate of the active power output from the WPP 12 is determined based on the model 101 of the WPP 12 and may be determined for comparison to the measurement of the active power output from the WPP 12. For example, the estimate of the active power output may be determined for the same instance as the measurement of the active power output. The comparison may be made to determine an error, or percentage error, between the estimated active power output and the measured active power output.

It shall be appreciated that the controller 100 may use one or methods for determining the estimate of the active power output from the WPP 12.

Figure 4:
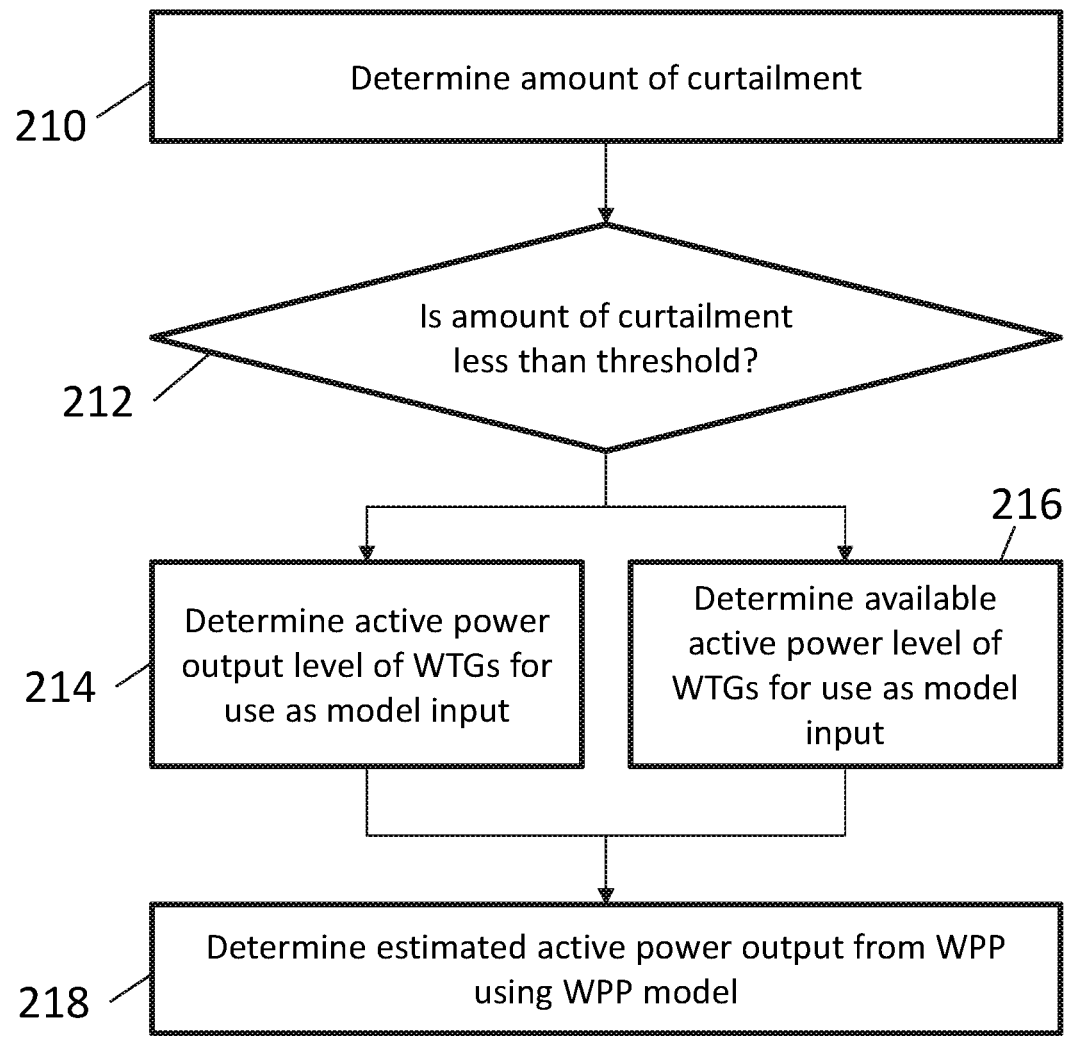
FIG. 4 shows example sub-steps of the method of FIG. 3 according to an embodiment of the invention.

To give an example, the method 200 may include sub-steps 210 to 218, as shown in FIG. 4, for this purpose, which shall now be described in more detail.

In sub-step 210, the controller 100 may receive information that is indicative of an amount of power curtailment at the WTGs 14. For example, the controller 100 may receive one or more measurement signals from the WTG controllers 15 comprising information that is indicative of an amount of spinning reserve, or curtailment, of the WTGs 14. Based on the one or measurement signals, the controller 100 is configured to determine an amount of power curtailment of the WTGs 14.

In sub-step 212, the controller 100 may compare the determined amount of power curtailment to a respective sensitivity threshold, which may correspond to substantially zero curtailment, for example. The sensitivity threshold may be configured to determine whether the power curtailment is sufficiently small so as to have a negligible effect on the active power output, for example.

When there is negligible, or zero, power curtailment, the active power output from the WPP 22 can be assumed to be equal to the available active power. Hence, if the amount of power curtailment is less than, or equal to, the sensitivity threshold (e.g. if there is no power curtailment), the controller 100 may proceed to determine, in sub-step 214, the available active power levels at the WTGs 14 for use as model inputs to the model 101 of the WPP 12.

In particular, the controller 100 may receive a measurement signal comprising one or more windspeed measurements at the WTGs 14 and determine the available active power levels at the WTGs 14 based on the windspeed measurements. The one or more windspeed measurements may, for example, be determined at the WTG controllers 15, and received via the connectivity module 30.

It shall be appreciated that the controller 100 may use one or methods for determining the available active power levels at the WTGs 14 based on the one or more windspeed measurements that are not described in detail here to avoid obscuring the invention.

When the amount of power curtailment, is not negligible the active power output from the WPP 22 cannot be assumed to be equal to the available power. Hence, if the amount of power curtailment is more than the threshold (e.g. non-zero), in sub-step 212, the controller 100 may proceed to determine, in sub-step 216, the active power output levels of the WTGs 14 for use as model inputs to the model 101 of the WPP 12 instead.

In particular, the controller 100 may receive a measurement signal comprising one or more windspeed measurements, as in step 214, and determine the active power output levels of the WTGs 14 based on the windspeed measurements and the determined amount of power curtailment (e.g. based on the amount of curtailment of the WTGs 14 and/or the amount of spinning reserve at the WTGs 14).

It shall be appreciated that the controller 100 may use one or methods for determining the active power output levels of the WTGs 14 based on the one or more windspeed measurements and the amounts of curtailment, or spinning reserve at the WTGs 14.

In sub-step 218, the controller 100 determines the estimated active power output from the WPP 12 using the model 101 with the model inputs determined in sub-step 214, or sub-step 216, respectively.

The model 101 uses the model inputs, relating to the available or active power levels of the WTGs, to determine the resulting power delivery levels at the main grid 16, accounting for power loss between the WPP 12 and the main grid 16.

The model 101 may take various forms for modelling the power delivery levels at the main grid 16 but, continuing the non-limiting example used previously, the estimated active power output from the WPP 12 may be determined according to the equation:

$$Pest = \Sigma Pwtg - (a \cdot (\Sigma Pwtg)^2 + b \cdot (\Sigma Pwtg) + c));$$

where, in this case, Pest is the estimated active power output from the WPP 12; and $\Sigma Pwtg$ is the active power output level, or the available active power level, of the WTGs 14, as determined according to sub-step 214, or sub-step 216, respectively.

It shall be appreciated that, where the available active power level of the WTGs 14 is used as the model input (in the absence of curtailment), the estimated active power output from the WPP 12 is equivalent to an estimate of the available active power output from the WPP 12. However, where the active power output level of the WTGs 14 is used as the model input, the estimated active power output from the WPP 12 differs from the estimate of the available active power output from the WPP 12, as the power output is curtailed.

Upon completing steps 206 and 208, the controller 100 is provided with an estimate of the active power output from the WPP 12 and a measurement of the active power output from the WPP 12 for comparison.

Figure 5:
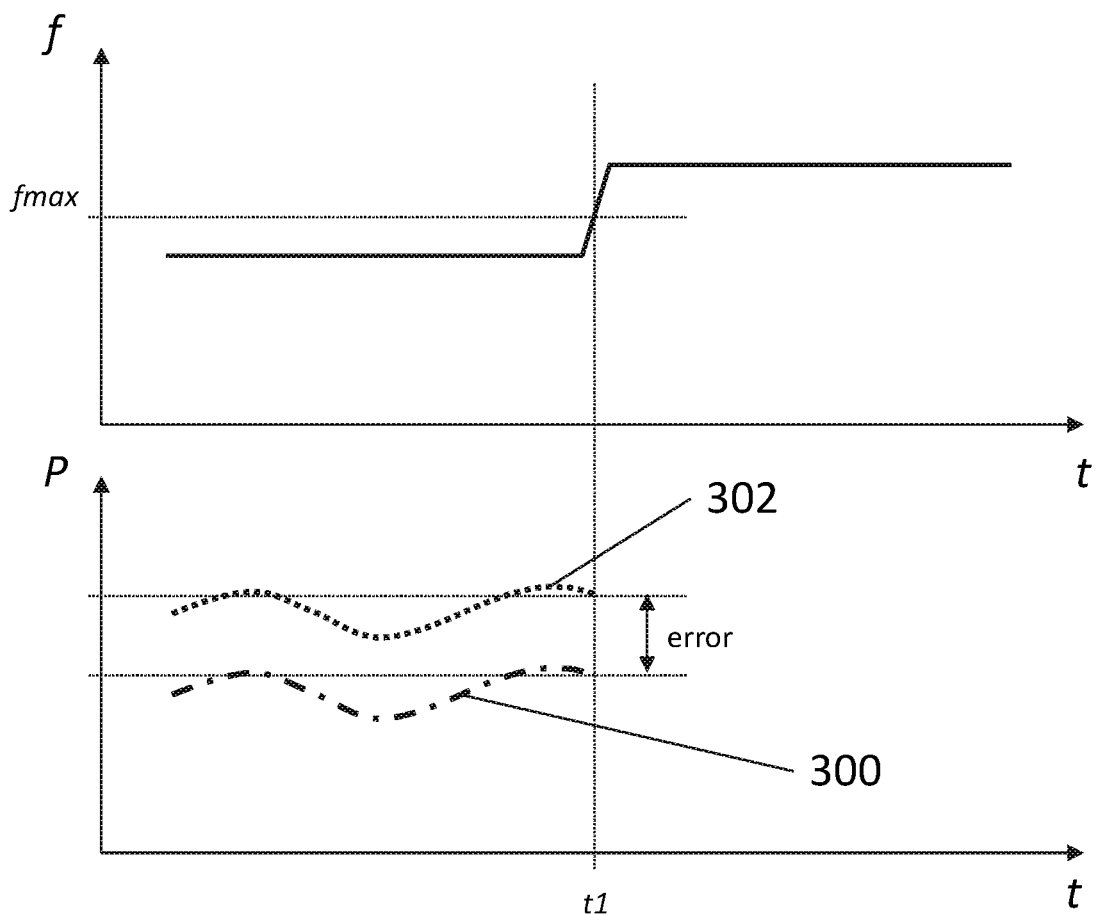
FIGS. 5 and 6 show a pair of charts illustrating estimated and measured active power outputs from the wind power plant of FIG. 1 while a measured frequency level is within a frequency deadband.
Figure 6:
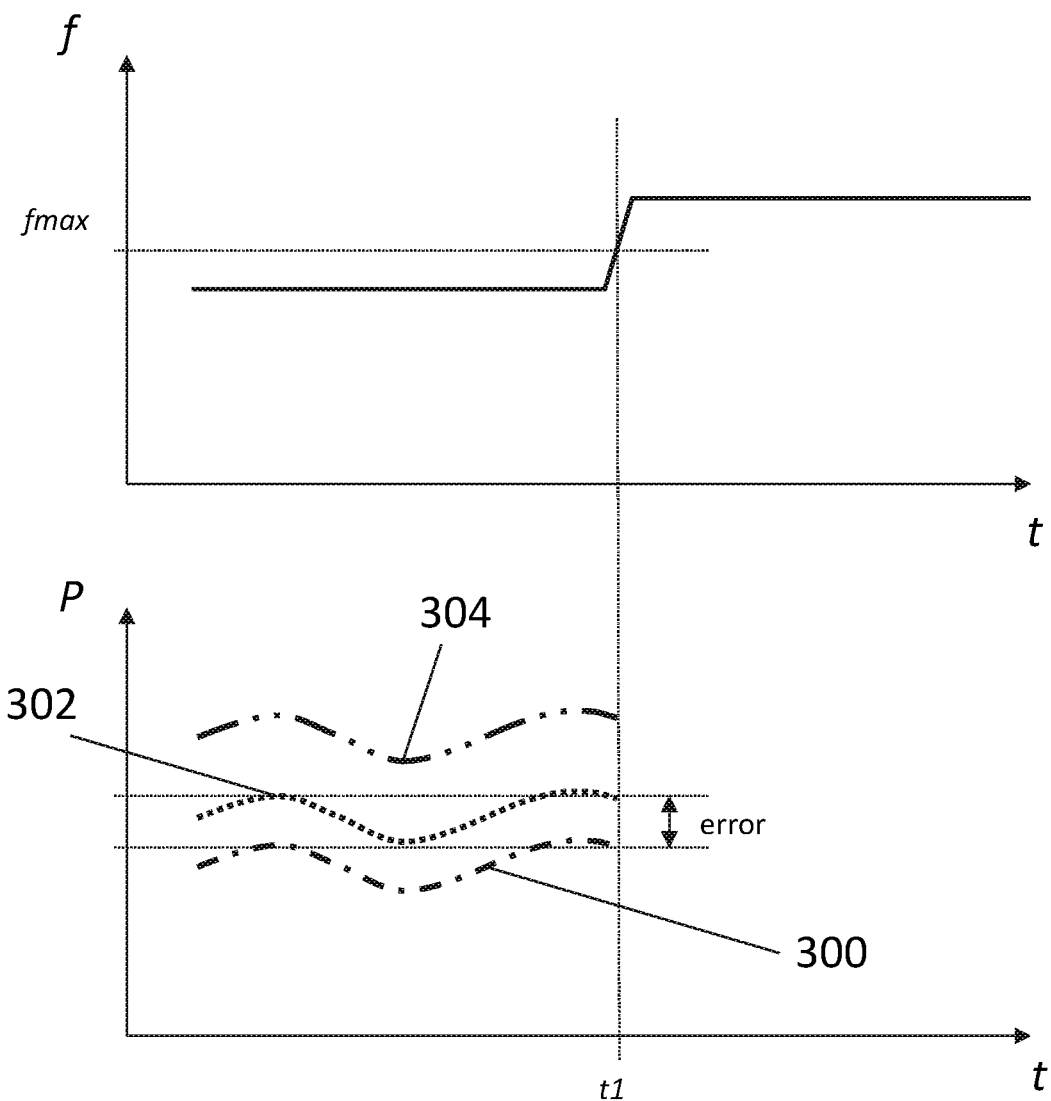

For context, FIGS. 5 and 6 are provided at this stage to illustrate the differences that arise between the measured, and the estimated, active power outputs determined by the method 200 respectively in the absence, and application, of curtailment.

Each of FIGS. 5 and 6 shows a respective chart depicting a first line 300 that illustrates the measured active power output level of the WPP 12 and a second line 302 that illustrates respective estimates of the active power output from the WPP 12. The first and second lines 300, 302 are shown for the period up to the point t1, during which the measured frequency level is within the frequency deadband. In FIG. 5, a situation with no curtailment is shown, whilst in FIG. 6 the active power output of the WTGs 14 is curtailed to some extent.

As shown, the first and second lines 300, 302 differ between FIGS. 5 and 6 because the active power output is curtailed to some extent in the representation shown in FIG. 6. Furthermore, a third line 304 is also shown in FIG. 6, illustrating a hypothetical estimate of the available active power level of the WPP 12 for the same period. The estimate of the available active power level is greater than the measured and estimated active power output levels of the WPP 12 due to the curtailment. It shall be appreciated that the third line 304 is shown purely for the sake of illustration in this chart.

Significantly, regardless of whether there is any power curtailment, the estimated active power output from the WPP 12 differs from the measured active power output level of the WPP 12 for the respective conditions, as shown in FIGS. 5 and 6. The differences are primarily due to modelling errors in the model 101 of the WPP 12, which arise because the model 101 is not a perfect representation of the WPP 12, causing the estimated active power output to deviate from the measured active power output. Such errors are present in any WPP model that is used by virtue of the fact that a model is not a perfect analogue of the dynamic system that it attempts to replicate.

At this stage it should be noted that the modelling errors are an intrinsic part of the model 101 and so will also affect subsequent estimates of the available active power from the WPP 12 during a frequency event, i.e. after the point t1, as shall be described in more detail in relation to a later stage of the method 200.

Returning to the method 200 shown in FIG. 3, at the time t1, the controller 100 receives a further measurement of the frequency level of the main grid 16 and determines, in step 220, that the frequency level has crossed the frequency deadband, in an over frequency event. For example, the controller 100 may compare the measured frequency level to the upper limit of the frequency deadband and determine that the frequency level exceeds that limit.

When the measured frequency level is outside of the frequency deadband, the controller 100 is configured to determine and dispatch active power set points for controlling the WPP 12 according to steps 222 to 228, which shall now be described in more detail.

In step 222, the controller 100 is configured to determine the estimate of available active power that the WPP 12 can supply to the main grid 16 using the model 101.

In an example, the controller 100 may therefore receive a further measurement signal comprising one or more windspeed measurements at the WTGs 14, which the controller 100 uses to determine the available active power levels at the WTGs 14. The one or more windspeed measurements may, for example, be determined at the WTG controllers 15 during the over frequency event, and received via the connectivity module 30. It shall be appreciated that the controller 100 may use one or methods for determining the available active power levels at the WTGs 14 based on the one or more windspeed measurements. In another example, the available active power levels at the WTGs 14 may be determined directly by the respective WTG controllers 15 instead. Accordingly, the controller 100 may therefore receive a further measurement signal from the WTG controllers 15 comprising the determined available active power levels at the WTGs 14.

In any case, the controller 100 uses the available active power levels at the WTGs 14 as inputs to the model 101 to determine the estimate of available active power for delivery to the main grid 16.

Continuing the non-limiting example of the model 101 used previously, the estimate of available active power may therefore be determined according to the equation:

$$Pest = \Sigma Pwtg - (a \cdot (\Sigma Pwtg)2 + b \cdot (\Sigma Pwtg) + c));$$

where, in this case, Pest is the estimated available active power that the WPP 12 can supply to the main grid 16; and $\Sigma Pwtg$ is the available active power level of the WTGs 14.

However, as mentioned previously, there will inevitably be an error in the estimate of available active power due to modelling errors in the model 101.

To mitigate the effect of such modelling errors, the controller 100 is advantageously configured to determine an estimate correction factor, in step 224, based on the estimated active power output and the measured active power output for the WPP 12 determined when the frequency level was within the frequency deadband.

In particular, in step 224, the controller 100 is configured to determine the estimate correction factor based on a comparison between the estimated active power output and the measured active power output for the WPP 12 determined previously (in steps 206 and 208).

One or more methods may be used for comparing the estimated active power output to the measured active power output. In an example, the estimate correction factor may take the form of a difference, or error value, between the estimated active power output and the measured active power output for the WPP 12.

The estimate correction factor may therefore be determined by subtracting the estimated active power output from the measured active power output. For example, the controller 100 may determine the measured active power output and the estimated active power output at a particular point, such as the point, t1, where the frequency level crosses the frequency deadband. Alternatively, the controller 100 may determine the most recently measured active power output from the WPP 12 that precedes the measured frequency level being outside of the frequency deadband, for example, and determine (i.e. calculate or identify) the estimated active power output from the power plant that is concurrent with that determined measured active power output for comparison.

In step 226, the controller 100 determines a corrected estimate of available active power from the model of the WPP 12 using the estimate correction factor determined in step 224.

Continuing the non-limiting example described in step 224, the difference or error value may therefore be added to the estimate of available active power that the WPP 12 can deliver to the main grid 16, as determined by the model 101 in step 222, to provide the corrected estimate.

In step 228, the controller 100 determines active power set points for controlling the WPP based on the corrected estimate of available active power and the measured frequency level.

In an example, the controller 100 may determine a frequency dependent offset based on the measured frequency level using the P-f table 102. For example, the controller 100 may access the P-f table 102 and determine the power adjustment value, ΔP, corresponding to the measured frequency level, $f_{meas}$.

The controller 100 may then determine the active power set points by applying the determined power adjustment value to the corrected estimate of available active power and dispatch the determined active power set points to the WTGs 14 and their controllers 15.

The WTG controllers 15 may receive the determined active power set points and operate the WTGs 14 accordingly to control the active power output of the WPP 12 to support the main grid 16. In this manner, the method 200 is configured to determine accurate estimates of the available active power supply from the WPP 12, leading to enhanced control of the active power output from the WPP 12 and supporting a quick return to the frequency deadband. Upon returning to the frequency deadband, the method 200 may resume at step 202, for example.

Figure 7:
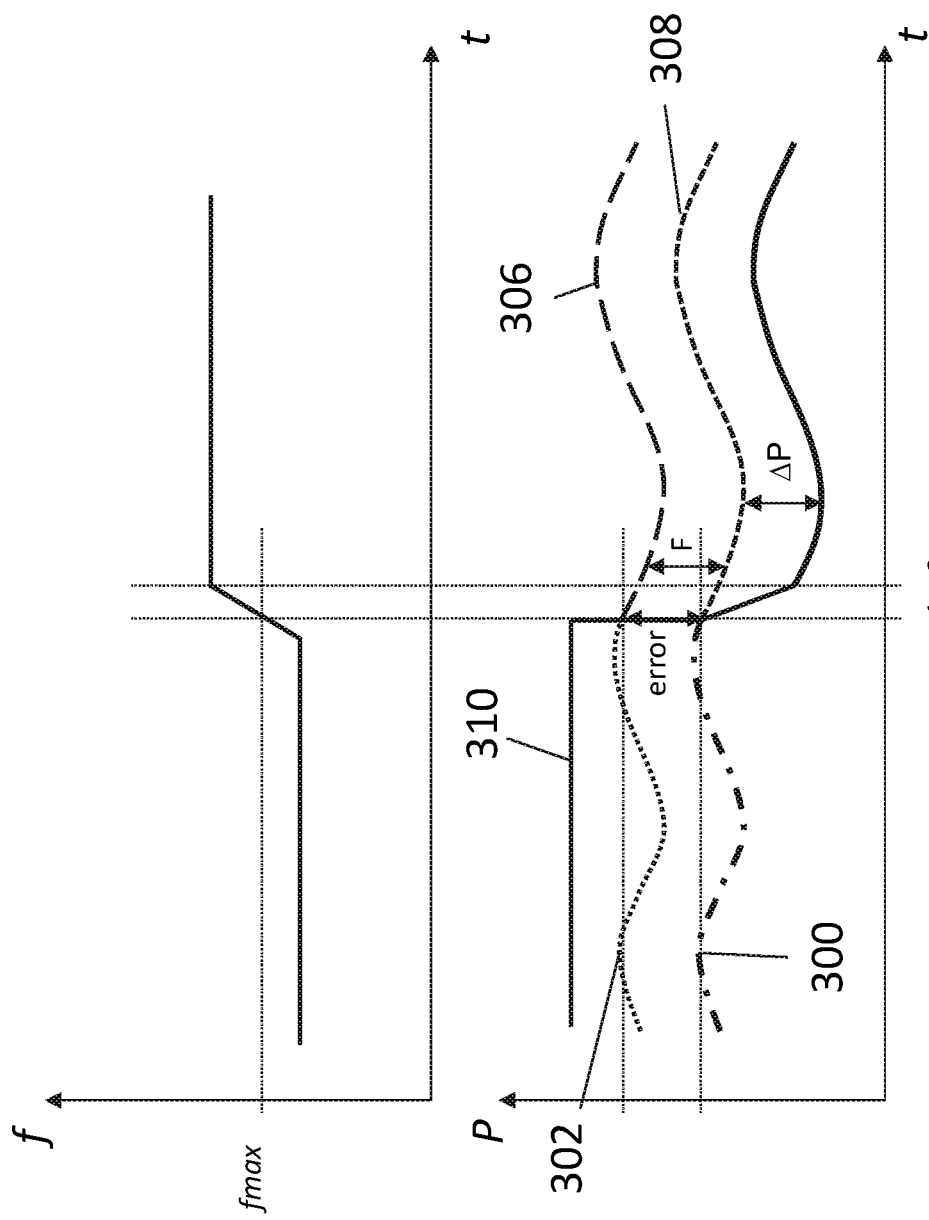
FIGS. 7 and 8 show a pair of charts illustrating various active power outputs from the wind power plant of FIG. 1 for a period that includes a frequency event, as determined according to the method shown in FIG. 3.
Figure 8:
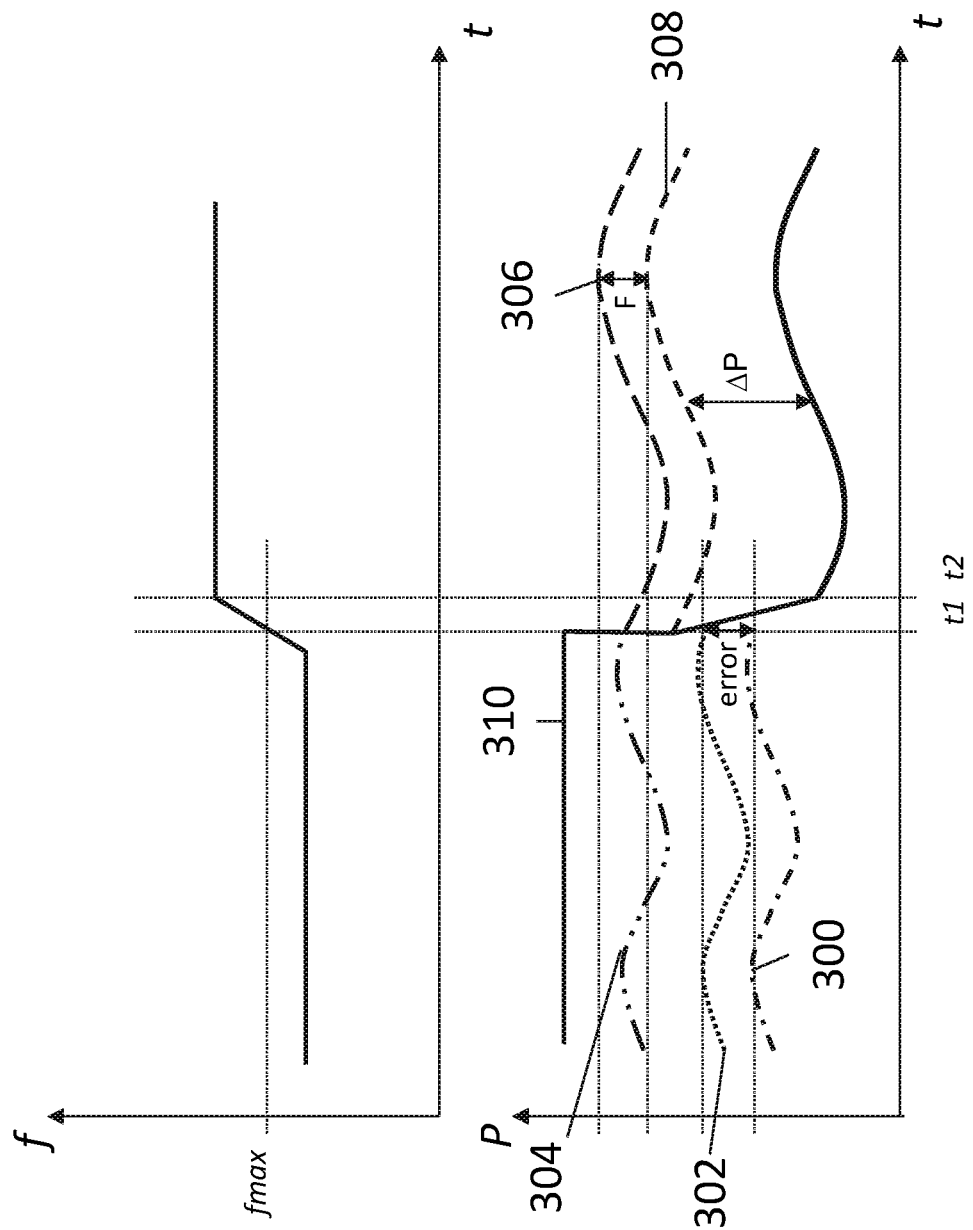

The overall process is shown in FIGS. 7 and 8, which provide respective charts illustrating the determination of the active power set points in respective cases where the amount of curtailment is below the power threshold (or zero), and when the amount of curtailment is above the power threshold.

Each of FIGS. 7 and 8 shows a first line 300 depicting the measured active power output level of the WPP 12 and a second line 302 depicting the estimated active power output from the WPP 12 for the period up to the time, t1, as is also shown in FIGS. 5 and 6.

In FIG. 8, a third line 304 is also shown depicting an estimate of the available active power level of the WPP 12, for the period up to the time, t1, which is shown purely for the sake of clarity, illustrating the relative shortfall in power output due to the curtailment.

Each Figure also includes a fourth line 306 illustrating the estimate of available active power that the WPP 12 can supply to the main grid during the frequency event (after the point, t1), a fifth line 308 illustrating the corrected estimate of available active power, and a sixth line 310 illustrating an example reference line that may be used for determining the active power set points.

As shown in the Figures, the corrected estimate of available active power is offset from the estimate of available active power by the estimate correction factor, F, which is equal to the difference between concurrent points along the first and second lines 300, 302 in this example.

The reference line 310 may be substantially constant initially, as shown, whilst the measured frequency level is within the frequency deadband. However, when the measured frequency level crosses the frequency deadband (at the point, t1) there is a step change in the reference line 310 to equal the corrected estimate of available active power. During the frequency event that follows, the reference line 310 is then offset from the corrected estimate of available active power 308 by the frequency dependent offset, ΔP. Notably, at a time, t2, the measured frequency level peaks and settles at a substantially constant frequency level. Accordingly, after the time t2, the frequency dependent offset, ΔP, is constant and the reference line 310 of active power set points therefore varies with a constant offset from the corrected estimate of available active power 308.

FIGS. 7 and 8 illustrate that the corrected estimate of available active power is determined with accuracy regardless of whether there is any power curtailment of the WTGs 14 whilst the frequency level is within the frequency deadband.

Additionally, although the example charts illustrate an over-frequency event, where the active power output is reduced to support the main grid 16, it shall be appreciated that the method 200 is equally applicable to an under-frequency event, where the active power is increased to support the main grid 16.

It will be appreciated that various changes and modifications can be made to the present invention without departing from the scope of the present application.

In an example, the controller 100 may be configured to determine the estimate correction factor based on a ratio, or percentage error, of the measured active power output with respect to the estimated active power output, in step 224, as opposed to a difference value.

Accordingly, in step 224, the controller 100 may compare respective values of the measured active power and the estimated active power output, substantially as described previously. However, in this case, the controller 100 may determine a ratio of the measured active power output to the estimated active power output. In step 226, the controller 100 may therefore scale the estimate of available active power according to the determined ratio in order to determine the corrected estimate of available active power.

Thereafter, the method may proceed to determine and dispatch the active power set points for controlling the active power output, substantially as described in the previous example.

Figure 9:
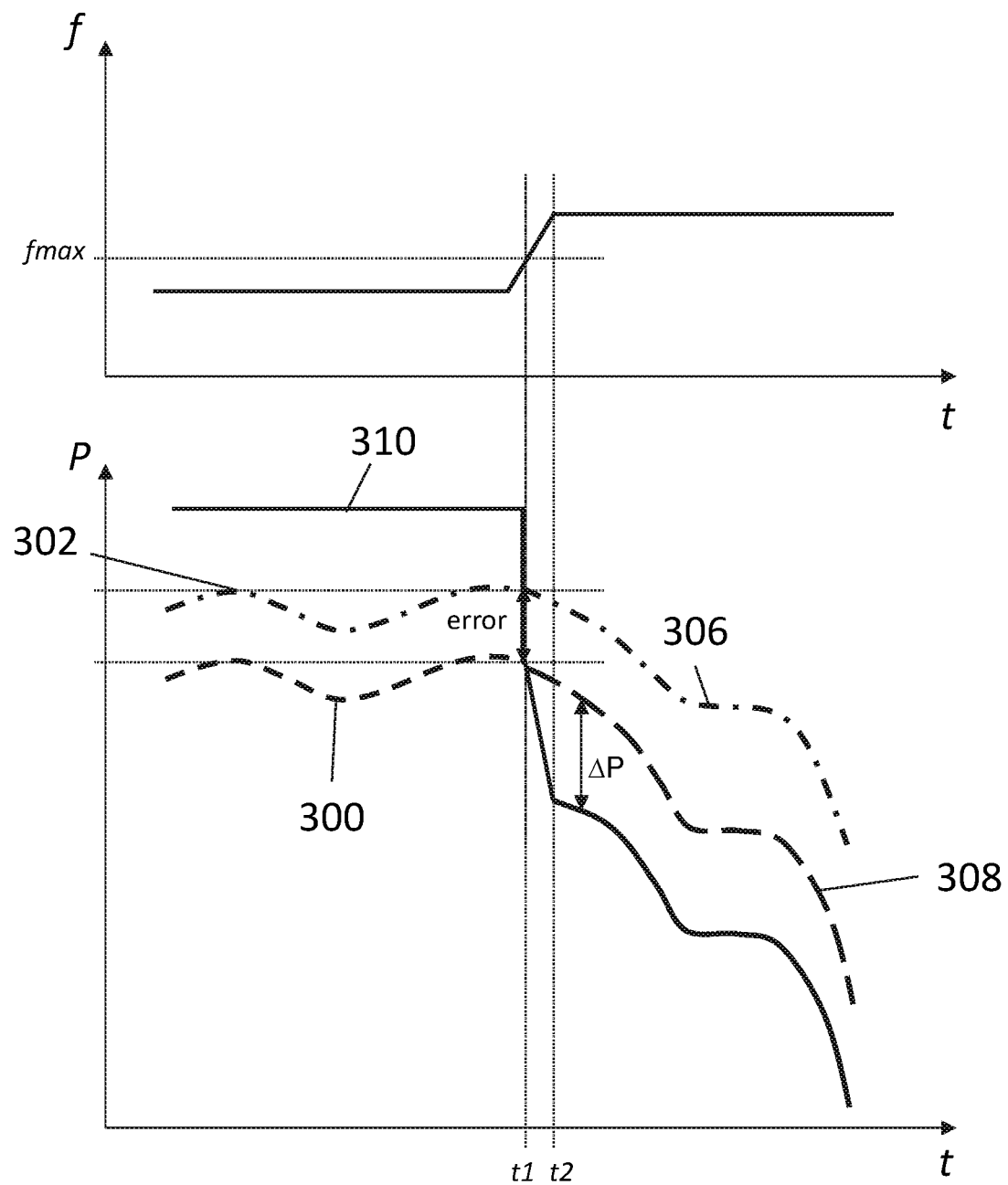
FIG. 9 shows a chart illustrating various active power outputs from the wind power plant of FIG. 1 for a period that includes a frequency event, as determined according to another method in accordance with an embodiment of the invention.

This process is illustrated in FIG. 9, which shows a further chart, in the same form of FIG. 7, illustrating the determination of the active power set points in a case where the amount of curtailment is below the power threshold (or zero).

In this case, it is shown that the estimated available active power from the WPP 12 reduces during the frequency event, for example due to a reduction in wind speed after the point t2, and the reference line 310 (used for determining the active power set points) is shown to be scaled accordingly by the estimate correction factor.

In a further example, the controller 100 may be configured to determine the estimate correction factor based on a combination of the error value and the percentage error. Accordingly, in step 224, the controller 100 may compare values of the measured active power and the estimated active power output to determine the error value and the percentage error, substantially as described previously. Thereafter, the controller 100 may determine the estimate correction factor using a function that combines, for example in relative proportions, the error value and the estimate of available active power from the model of the WPP 12 scaled according to the percentage error.

To give an example, the controller 100 may use the following function to determine the estimate correction factor:

$$Pc = X*(e_v) + (1-X)*(e_p)*Pnet + Pnet;$$

where Pc is the corrected estimate of available active power, $e_v$ is the determined error value, $e_p$ is the percentage error, X is a proportional contribution of the error value, Pnet is the estimate of available active power. The proportional contribution of the error value, X, is a predetermined constant that may be determined to provide an optimal combination of the of the error value and the percentage error.

The controller 100 may then determine the corrected estimate of available active power, in step 226, by adding the estimate correction factor to the estimate of available active power. Thereafter, the method may proceed to determine and dispatch the active power set points for controlling the active power output, substantially as described in the previous examples.

In another example, the controller 100 may be configured to determine the expected active power output from the WPP 12 based on the available active power level at the WTGs 14, without checking for power curtailment. Accordingly, step 206 of the method may simply comprise determining the available active power level at the WTGs 14 (for example based on one or more wind speed measurements) and using the available active power level at the WTGs 14 as the model input to the model 101. In this example, it shall be appreciated that the active power set points are determined in substantially the same manner, however the further processing associated with determining the amount of curtailment is removed.

In another example, the controller 100 may be configured to receive the measured active power output from the WPP 12, in step 208, and/or to estimate the active power output from the WPP 12, in step 206, in response to the frequency level reaching the upper limit, or the lower limit, of the frequency deadband. In this manner, the controller 100 may determine the measured active power output and the estimated active power output, for comparison, at the instance (t1) where the measured frequency level crosses the frequency deadband. In another example, the measurement signal, received in step 208, may comprise a series of time-varying measurements of the active power output 16 supplied by the WPP 12 to the main grid 16 for the period leading up to, and including, the point t1. Where a plurality of values of the measured active power output are determined whilst the measured frequency level is within the frequency deadband, the estimated active power output may be determined for corresponding points, in step 206, or the controller 100 may determine the most recently measured active power output from the WPP 12 that precedes the measured frequency level being outside of the frequency deadband, and determine the estimated active power output from the power plant that is concurrent with that determined measured active power output.

In a further example, the estimate correction factor may be determined, in step 226, by subtracting an average, or suitable representative value, of the estimated active power output from a corresponding representative value of the measured active power output in the period leading up to, and including, the point, t1.

In another example, the controller 100 may be configured to determine the estimate correction factor, substantially as described in step 224, whilst the frequency level is within the frequency deadband (i.e. before the frequency event). For example, the controller 100 may be configured to determine, and/or update, the estimate correction factor at regular intervals or continuously, such that one or more estimate correction factors are determined whilst the frequency level is within the frequency deadband, for example up to the point t1 shown in FIGS. 7 and 8. To give an example, after determining the estimated active power output of the WPP 12, in step 206, and determining the measured active power output of the WPP 12, in step 208, the method 200 may include a further step of determining an estimate correction factor. In this manner, the controller 100 may determine, and/or update, the estimate correction factor at the same rate as the measurements, or estimates, of the active power output. In which case, each estimate correction factor may be determined based on a comparison of the most recently determined estimated active power output, as determined in step 206, and the most recently measured active power output, as determined in step 208.

In an example, each such determination of the estimate correction factor may be stored in a memory storage, such as the memory module 32. Thereafter, when the measured frequency level subsequently moves outside of the frequency deadband (during a frequency event), the controller 100 may be configured to determine the estimate correction factor, in step 224, for correcting the estimate of available active power, in step 226, by recalling (or retrieving or reading) one of the determined estimate correction factors stored in the memory module 32. For example, the controller 100 may access the memory module 32 and recall the most recently determined estimate correction factor stored in the memory module 32. It shall be appreciated that the recalled estimate correction factor would have been determined whilst the measured frequency level was within the frequency deadband (i.e. at or before the point t1 in FIGS. 7 and 8). For example, the controller 100 may recall the estimate correction factor determined for the point that immediately precedes the measured frequency level moving outside the frequency deadband. The method 200 may then include the subsequent steps of correcting the estimate of available active power, in step 226, and determining and dispatching the active power set points based on the corrected estimate of available active power, in step 228, substantially as described in the previous examples, to suitably control the WPP 12 during the frequency event.

In a further example, the controller 100 may also be configured to determine the estimate of available active power for the WPP 12 to supply to the grid 16, and to correct that estimate (using the estimate correction factor), while the frequency level of the main grid 16 is within the frequency deadband. For example, the method 200 may include further steps of determining the estimate of available active power for the WPP 12 to supply, substantially as described in step 222, and correcting that estimate, substantially as described in step 226, whilst the measured frequency level is within the frequency deadband. In this manner, the controller 100 may determine a corrected estimate of available active power for the WPP 12 to supply to the grid 16 while the frequency level of the grid 16 is within the deadband and as the frequency level moves outside of the deadband. Notably, whilst the frequency level is within the deadband, the estimate correction factor may be determined multiple times, for example being regularly updated and iteratively improved, such that the determined estimate correction factor provides suitable error correction when the frequency level subsequently moves outside of the deadband, in a frequency event. By virtue of this approach, any step changes in the estimate of available active power that may occur in the previous examples (as the frequency level crosses the frequency deadband and the error correction is applied) are minimised.

The invention claimed is:
1. A method for controlling active power output of a renewable energy power plant, comprising one or more renewable energy generators, the method comprising:
while a measured frequency level of a power network to which the power plant is connected is within a frequency deadband:

determining an estimated active power output from the power plant according to a model of the power plant and one or more model inputs; and
determining a measured active power output from the power plant;
the method further comprising:
determining an estimate of available active power for the power plant to supply according to the model of the power plant and one or more model inputs;
determining an estimate correction factor based on a comparison of the estimated active power output with respect to the measured active power output;
correcting the estimate of available active power based on the estimate correction factor to provide a corrected estimate of available active power; and
when the frequency level of the power network is outside the frequency deadband, determining and dispatching active power set points for controlling the one or more renewable generators of the power plant, the set points being determined based on the corrected estimate of available active power and the frequency level.

2. The method according to claim 1, wherein determining the estimate correction factor comprises at least one of:
determining a difference between the estimated active power and the measured active power output; or
determining a ratio of the measured active power output with respect to the estimated active power output.

3. The method according to claim 2, wherein the correction factor is determined based on a combination of:
the determined difference; and
the estimate of available active power, scaled according to the determined ratio.

4. The method according to claim 1, wherein the model of the power plant comprises a model of the power loss between the power plant and the power network.

5. The method according to claim 4, wherein the model of the power loss comprises a function in the form of a quadratic equation in terms of the one or more model inputs.

6. The method according to claim 4, wherein the model of the power plant comprises a model of the output of the power plant to the power network from which the model of the power loss is subtracted.

7. The method according to claim 1, wherein the one or more model inputs for determining the estimated active power output comprise active power output measurements of the renewable energy generators.

8. The method according to claim 7, wherein the one or more model inputs for determining the estimate of available active power comprise available active power measurements of the renewable energy generators.

9. The method according to claim 8, wherein the one or more renewable energy generators comprises one or more wind turbine generators, and wherein available active power measurements of the renewable energy generators are based on wind speed measurements of the one or more wind turbine generators.

10. The method according to claim 1, wherein the one or more model inputs for determining the estimated available active power output comprise available active power measurements of the renewable energy generators.

11. The method according to claim 1, comprising determining an amount of curtailment of the active power output of the renewable energy generators; wherein:
if the amount of curtailment is substantially non-zero, the one or more model inputs for determining the estimated active power output comprises active power output measurements of the renewable energy generators; or
if the amount of curtailment is substantially zero, the one or more model inputs for determining the estimated active power output comprises available active power measurements of the renewable energy generators.

12. The method according to claim 1, wherein determining the estimate correction factor comprises: calculating the estimate correction factor when the frequency level of the power network is outside the frequency deadband based on the measured active power output from the power plant, and the estimated active power output from the power plant, determined while the frequency level is within the frequency deadband.

13. The method according to claim 12, wherein calculating the estimate correction factor when the frequency level of the power network is outside the frequency deadband comprises:
determining the most recently measured active power output from the power plant that precedes the frequency level of the power network being outside the frequency deadband; and
determining, for comparison, the estimated active power output from the power plant that is concurrent with that determined measured active power output.

14. The method according to claim 1, wherein determining the estimate correction factor comprises:
calculating the estimate correction factor while the frequency level of the power network is within the frequency deadband.

15. The method according to claim 14, wherein determining the estimate correction factor further comprises:
storing the calculated estimate correction factor in a memory storage; and
when the measured frequency level of the power network is outside the frequency deadband, recalling the calculated estimate correction factor from the memory storage.

16. The method according to claim 15, wherein the most recently calculated estimate correction factor is recalled from the memory storage when the measured frequency level of the power network is outside the frequency deadband.

17. The method according to claim 16, wherein determining the estimate of available active power for the power plant to supply and correcting the estimate of available active power are carried out while the frequency level of the power network is within the frequency deadband and when the frequency level of the power network is outside the frequency deadband.

18. The method according to claim 1, wherein determining the estimate of available active power for the power plant to supply and correcting the estimate of available active power are carried out, at least, when the frequency level of the power network is outside the frequency deadband.

19. A power plant controller configured to perform the method of claim 1.

20. A non-transitory computer-readable storage medium comprising instructions that, when executed by a computer, cause the computer to perform the method of claim 1.

21. A power plant controller, comprising: a processor;
a memory containing code which, when executed by the processor, configures the processor to perform an operation for controlling active power output of a renewable energy power plant, comprising one or more renewable energy generators, the operation comprising:

while a measured frequency level of a power network to which the power plant is connected is within a frequency deadband:
  determining an estimated active power output from the power plant according to a model of the power plant and one or more model inputs; and
  determining a measured active power output from the power plant; the operation further comprising:
  determining an estimate of available active power for the power plant to supply according to the model of the power plant and one or more model inputs;
  determining an estimate correction factor based on a comparison of the estimated active power output with respect to the measured active power output;
  correcting the estimate of available active power based on the estimate correction factor to provide a corrected estimate of available active power; and
  when the frequency level of the power network is outside the frequency deadband, determining and dispatching active power set points for controlling the one or more renewable generators of the power plant, the set points being determined based on the corrected estimate of available active power and the frequency level.

22. A non-transitory computer-readable storage medium comprising instructions that, when executed by a computer, cause the computer to perform an operation for controlling active power output of a renewable energy power plant, comprising one or more renewable energy generators, the operation comprising:
  while a measured frequency level of a power network to which the power plant is connected is within a frequency deadband:
    determining an estimated active power output from the power plant according to a model of the power plant and one or more model inputs; and
    determining a measured active power output from the power plant; the operation further comprising:
    determining an estimate of available active power for the power plant to supply according to the model of the power plant and one or more model inputs;
    determining an estimate correction factor based on a comparison of the estimated active power output with respect to the measured active power output;
    correcting the estimate of available active power based on the estimate correction factor to provide a corrected estimate of available active power; and
    when the frequency level of the power network is outside the frequency deadband, determining and dispatching active power set points for controlling the one or more renewable generators of the power plant, the set points being determined based on the corrected estimate of available active power and the frequency level.

* * * * *